Figure 1:
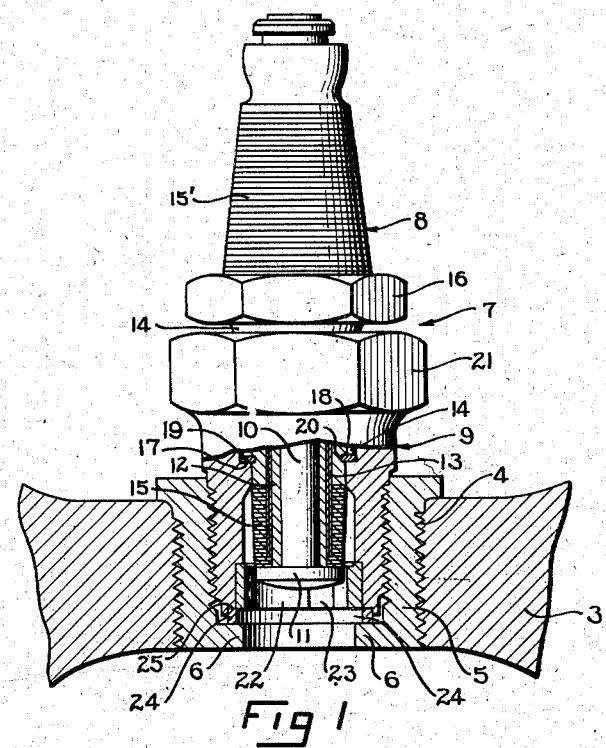

Aug. 6, 1940.　　M. G. WEATHERLY　　2,210,644
IGNITION APPARATUS
Filed April 17, 1939

INVENTOR.
Morgan G. Weatherly
BY
F. Bascom Smith
ATTORNEY.

Patented Aug. 6, 1940

2,210,644

UNITED STATES PATENT OFFICE 2,210,644

IGNITION APPARATUS

Morgan G. Weatherly, Mount Upton, N. Y., assignor to Bendix Aviation Corporation, South Bend, Ind., a corporation of Delaware Application April 17, 1939, Serial No. 268,206

10 Claims. (Cl. 123—169)

This invention relates to ignition apparatus adapted for use in internal combustion engines or the like and more particularly to spark plugs and sealing means therefor.

In view of the fact that spark plugs are very frequently removed from internal combustion engine cylinders and disassembled for purposes of cleaning, inspection, adjustment, repair or replacement, it has been heretofore proposed, particularly where the engine cylinders are made of aluminum alloy or other soft metal, to provide hard metal bushing in the cylinder wall for receiving the spark plug. Damage to the cylinder itself by continuous removal and insertion of spark plugs is thus avoided. It has also been proposed to provide soft metal gaskets between the base of the spark plug and an internal flange on the bushing or cylinder and between separate parts of the plugs to prevent leakage of gases and obviate the numerous detrimental effects which the hot gases have on the screw threads which hold the plug in position and the parts thereof together. The mere insertion of such gaskets has not proved entirely satisfactory in practice since it is extremely difficult to properly install a spark plug and gasket of the nature heretofore known, particularly when the spark plug must be screwed upwardly at an angle to the vertical into the lower cylinders of a radial aircraft engine. Under such circumstances the gasket will seldom remain in proper position while the plug is being screwed into place and is accordingly often-times crushed or deformed thereby becoming a drawback or damaging feature rather than an asset or benefit. Since the operator cannot see the gasket after he starts to screw the plug into place, he can never be sure whether the gasket remains in its proper position or not.

When gaskets of the above type are in use or are improperly installed the hot gases of combustion cause the innermost threads on the cylinder or bushing, for example, to deteriorate and wear off onto the spark plug threads. Accordingly, when the spark plug is removed or disassembled for any purpose, the built up threads on the part removed tend to damage the remaining threads on the cooperating part, such as on the cylinder or bushing. Also carbon and lead from leaded fuels are deposited between the cooperating threads and often cause what is known as spark plug seizure thereby making it impossible to remove the plug or parts thereof without demolishing the threads. Furthermore, when sharp edges of the threads either on the plug or cylinder are exposed to the hot gases of combustion in the cylinder said edges become heated to the point of glowing and cause pre-ignition which has very detrimental effects.

Attempts have been made to make gaskets of the type used between the plug and cylinder large enough to engage the sides of the threaded opening into which the spark plug is screwed. The pressure exerted on these gaskets by screwing the spark plugs tightly into place causes the soft metal thereof to expand into the threads of the cylinder or bushing and hence render it extremely difficult to remove the gasket after removal of the spark plug. Attempts to remove gaskets thus lodged in the cylinder or bushing often result in damage to the bushing or cylinder threads.

It is accordingly an object of the present invention to provide novel apparatus whereby the foregoing disadvantages and difficulties may be readily overcome.

Another object of the invention is to provide novel means whereby an efficient seal between the combustion chamber of an internal combustion engine and the threads of a spark plug is insured.

A further object is to provide a novelty combined spark plug and sealing gaskets.

The above and further objects and novel features of the invention will more fully appear from the following detailed description when the same is read in connection with the accompanying drawing. It is to be expressly understood, however, that the drawing is for the purpose of illustration only and is not intended as a definition of the limits of the invention, reference being primarily had for this latter purpose to the appended claims.

Figure 2:
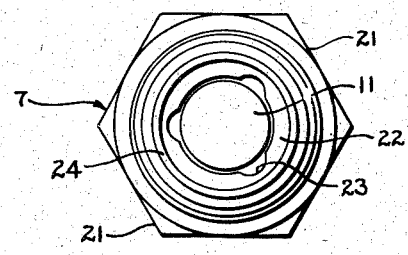

In the drawing, wherein like reference characters refer to like parts throughout the several views, Fig. 1 is a side elevation, partly in section and with parts broken away, showing apparatus embodying one form of the present invention; and, Fig. 2 is a bottom view of said apparatus.

In the single embodiment illustrated in the drawing, by way of example, the invention is shown in combination with a cylinder head or wall 3 of an internal combustion engine having a threaded bore 4. A hard metal bushing 5 is adapted to threadedly engage said bore, said bushing being internally threaded and having an inwardly extending flange or shoulder 6 formed integrally therewith at the base or inner end thereof. A spark plug 7 is screwed into said bushing and, as shown in the drawings, said spark plug consists of a central electrode assembly 8 and a shell member 9.

Electrode assembly 8 may be of any suitable type well known in the art and, in the form illustrated, comprises a central electrode having an enlarged disk-like terminal 11 concentric with and in close proximity to the interior of shell member 9. Electrode 10 is surrounded by a metallic sleeve 12, preferably of copper, and said sleeve is in turn surrounded by a sleeve or cigarette 13 comprising a plurality of layers of insulating material, such as mica. Surrounding the central portion of insulating sleeve 13 is a band or annular nut 14 which closely engages said sleeve and is spaced from the upper and lower ends of electrode 10 by stacks 15 and 15' of mica discs or other suitable insulating material. Nut 14 is threaded into shell 9 by means of suitable cooperating threads (not shown) and serves as a support for the entire central electrode assembly 8. The upper end 16 of nut 14 is preferably hexagonal or otherwise suitably shaped to facilitate disassembly of the plug.

Shell 9 and nut 14 are novelly combined with suitable sealing means therebetween to prevent the escape of gases from the combustion chamber of the engine and hence the deterioration of the cooperating threads on said shell and nut. In the form shown shell 9 is provided with an internal shoulder 17 and nut 14 is provided with a cooperating external shoulder 18 between which there is interposed a soft metallic gasket 19 of copper alloy or other suitable material. Adjacent shoulder 18, nut 14 is provided with an annular groove 20 of substantially the same thickness of gasket 19. When the spark plug is assembled gasket 19 is grooved between shoulders 17 and 18 and thus caused to expand into groove 20. Accordingly, upon removal of center electrode assembly 8 from shell 9 gasket 19 will not be lodged in shell 9 but may be withdrawn therefrom with nut 14 and any danger of the same being lost by the mechanic is obviated. Also by the reassembly of the parts of the plug proper positioning of the gasket is assured.

Shell 9 is provided with the customary hexagonal portion 17 for facilitating removal of shell 9 from bushing 5, said shell being externally threaded to cooperate with internal threads cut in said bushing or with threads in the cylinder wall when a bushing is not provided. An annular ground electrode 22 adapted to cooperate with portion 11 of electrode 10 is mounted and preferably silver soldered in the lower end of shell 9. A plurality of grooves or indentations 23 may be provided in electrode 22 to break up the continuity of that part of the electrode which is adjacent terminal 11 of electrode 10.

In order to protect the cooperating threads on bushing 5 and shell 9 from the corrosive and other undesirable effects resulting from contact with hot gases in the combustion chamber of the engine a sealing gasket is combined in a novel manner with shell 9 whereby said threads are isolated from the interior of plug 7 and from the combustion space. As shown, an annular gasket 24, preferably of a ductile metal, such as copper or the like, is interposed between the end of shell 9 and shoulder 6 of bushing 5, said gasket fitting tightly into a groove 25 provided in the end of said shell. As a result of being thus fitted, gasket 24 is frictionally held and carried by said shell member so that the proper positioning of the gasket relative to the shell and shoulder 6 is assured and an effective seal between said shell and shoulder is obtained.

Before installing spark plug 7 in bushing 5, after the latter is screwed into cylinder body 3, gasket 24 is inserted into groove 25, said gasket being frictionally held in shell 9 against inadvertent and accidental release, although the same may be readily pried from said groove by any suitable means, such as a screwdriver. Spark plug 7 is then screwed into bushing 5 until gasket 24 seats tightly on shoulder 6. During this installation there is no possibility of the gasket being crushed, bent or broken by becoming inclined to the axis of the bushing bore. Furthermore, when the spark plug is thereafter removed, the gasket is removed with it and may be readily replaced if desired.

There is thus provided a novel spark plug and sealing gasket combination whereby a gasket is interposed between the spark plug and the member in which said plug is secured in a novel manner, the gasket being thus accurately positioned in a desired relation to said plug and member with no possibility of displacement or distortion. There is further provided a novel method for operatively assembling said spark plug which comprises securely fixing a gasket in the end of the spark plug prior to the threading of said plug into the cylinder or bushing provided for receiving the same. As a result, a positive fluid-tight joint is insured between the gasket and the bushing when the plug is operatively positioned, and said joint protects the screw threads on said plug and said bushing from corrosion and seizure permitting frequent removal and replacement of the plug without damage to said threads. Sealing means for preventing leakage between the parts of the plug itself are also novelly combined with the plug.

Although only a single embodiment of the invention has been illustrated and described, it is to be expressly understood that the same is not limited thereto. For example, it will now be apparent to those skilled in the art that other types of spark plugs in addition to the type shown may usefully embody the present invention and that groove 25 in which gasket 24 is positioned may be three sided instead of two-sided, as shown. Various other changes may also be made in the design and arrangement of parts illustrated without departing from the spirit and scope of the invention. For a definition of the limits of the invention, reference is had primarily to the appended claims.

What is claimed is:

1. In ignition apparatus, the combination with a member having threads formed on the internal wall thereof and having an internally extending shoulder formed therewith of a spark plug shell threadedly engaging said member and a soft metallic gasket interposed between said shoulder and said shell, said gasket fitting into and frictionally engaging a groove provided in said shell and being carried by said shell.

2. In apparatus of the class described, a member having a portion thereof internally threaded, a spark plug adapted to threadedly engage said member and a gasket carried by said spark plug and adapted to engage an unthreaded portion of said member to provide a fluid tight seal between the engaging threads of said member and said spark plug and the interior of said spark plug.

3. In apparatus of the class described, a member internally threaded and having an internally extending shoulder formed therewith, a spark plug having an annular groove formed in the end thereof, said plug threadedly engaging said member, and a metallic gasket tightly fitting into said groove and carried by said plug, said gasket being adapted to seat on said shoulder and isolate the threaded wall of said member from the interior of said spark plug.

4. In an ignition device, an internally threaded bushing, an internally extending shoulder formed at the base of said bushing, a spark plug shell having a groove formed in the end thereof threadedly engaging said bushing, an electrode supported in said shell, and a ductile metallic gasket tightly fitting in said groove and carried by said shell, said gasket being adapted to seat on said bushing shoulder and isolate the engaging threads of said bushing and shell from the interior of said shell.

5. In a spark plug assembly, an electrode assembly comprising a central electrode, a surrounding sleeve or insulating material and an externally threaded nut member, an externally and internally threaded shell interiorly engaged by said nut member, said shell having an annular groove formed in the end thereof, an electrode secured to said shell, a soft metallic gasket fitting into said groove and carried by said shell, an internally threaded bushing into which said shell is adapted to be threaded, and an internally extending shoulder integral with said bushing, said gasket being adapted to seat on said shoulder and provide a fluid tight seal separating said electrodes from the threaded exterior of said shell.

6. A spark plug for an internal combustion engine comprising a cylindrical body portion, and a ring of ductile metal carried by said body portion and projecting beyond the end thereof.

7. A spark plug for an internal combustion engine comprising a cylindrical body portion having an annular recess in one end thereof, and a soft metallic ring frictionally engaging the walls of said recess projecting therefrom.

8. A spark plug for an internal combustion engine comprising a cylindrical body portion having a groove in one end thereof, and an annular sealing gasket of relatively soft metal carried by said body portion in said groove and extending beyond the end of said body portion.

9. A spark plug comprising a body, a center electrode assembly including a nut threadedly engaging said body, cooperating oppositely facing shoulders on said body and nut below the engaging threads thereon, an annular groove in said nut adjacent the shoulder thereof, and a soft metallic gasket interposed between said shoulders and extending into said annular groove.

10. A spark plug comprising a body having an annular recess in one end thereof, a center electrode assembly including a gland nut threadedly engaging said body and having an annular groove therein, cooperating shoulders on said body and nut below the engaging threads thereon, a soft metallic gasket interposed between said shoulders and extending into said annular groove, and an annular gasket of relatively soft metal frictionally engaging the walls of said recess and extending therefrom beyond the end of said body.

MORGAN G. WEATHERLY.